(12) United States Patent
Fujii et al.

(10) Patent No.: US 6,364,588 B1
(45) Date of Patent: Apr. 2, 2002

(54) NUT HAVING CORRUGATED THREAD

(75) Inventors: Naoyuki Fujii; Keiji Nomura, both of Aichi (JP)

(73) Assignee: Sugiura Seiksakusho Co., Ltd., Aichi (JP)

( * ) Notice: Subject to any disclaimer, the term of this patent is extended or adjusted under 35 U.S.C. 154(b) by 0 days.

(21) Appl. No.: 09/119,781

(22) Filed: Jul. 21, 1998

(30) Foreign Application Priority Data

Jul. 22, 1997 (JP) ............................................. 9-212480

(51) Int. Cl.⁷ ................................................ F16B 39/22
(52) U.S. Cl. ...................... 411/277; 411/437; 411/437.1
(58) Field of Search ................................. 411/277, 280, 411/308, 437, 436, 937.1, 937, 936

(56) References Cited

U.S. PATENT DOCUMENTS

| | | | | |
|---|---|---|---|---|
| 932,396 A | * | 8/1909 | Kenney | 411/277 |
| 2,255,384 A | * | 9/1941 | Hood | 411/277 |
| 2,333,290 A | * | 11/1943 | Brackett | 411/277 |
| 2,388,467 A | * | 11/1945 | Cole | 411/277 |
| 2,442,067 A | * | 5/1948 | Williams | 470/19 |
| 3,238,987 A | * | 3/1966 | McCartney | 411/937.1 |
| 3,240,248 A | * | 3/1966 | Waltermire | 411/277 |
| 5,139,380 A | * | 8/1992 | Reynolds | 411/937.1 |

FOREIGN PATENT DOCUMENTS

FR          838102      * 2/1939  .................. 411/277

* cited by examiner

Primary Examiner—Flemming Saether
(74) Attorney, Agent, or Firm—Snider & Associates; Ronald R. Snider

(57) ABSTRACT

It is an object of the invention to provide a structure of an internal thread portion for preventing looseness which structure allows a reduction in the torque required for the threaded engagement with an external-thread member and prevents a seizure. An exit end portion of a self-locking nut is taperingly contracted over the entire circumference thereof so as to form a contracted internal thread portion having a conical section. In addition, ridges of the contracted internal thread portion are provided with corrugation continuing circumferentially. The diameter of an inscribed circle which links the extremities of projections in the corrugation is smaller then the minor diameter of the external-thread member which is to be engaged threadedly with the internal thread portion. With the external-thread member threadedly engaged with the internal thread portion, a plurality of projections press the root or flanks of the external-thread member and are thereby elastically compressed by the reaction, so as to clamp the external-thread member from outside. In accordance with this arrangement, the tightening torque can be reduced and a seizure is prevented.

16 Claims, 10 Drawing Sheets

NUT HAVING CORRUGATED THREAD

This application claims the priority of Japanese Patent Application No. H9-212480 filed on Jul. 22, 1997, which is incorporated herein by reference.

FIELD OF THE INVENTION

The present invention relates to a structure of an internal thread portion for preventing looseness and a method of producing the same.

DESCRIPTION OF THE PRIOR ART

Conventionally, a self-locking nut which resists being loosened by vibrations or the like after tightened against a bolt has been used in a vehicle or the like.

For example, Japanese Patent Laid-Open Publication S55-30593 discloses such a self-locking nut of which an exit end portion is crimped from outside at a plurality of locations to form a plurality of (e.g., three) projections on the inner circumference of the internal thread.

In the nut on which crimping is performed locally at a plurality of locations from outside to partially deform the nut itself to form projections, however, a variation is prone to occur in the accuracy of dimension of the projections and the variation causes such defects as follows: A deficient projection will not provide a sufficient effect of preventing looseness. On the other hand, an excessive projection will cause excessive friction locally between the projections and the external thread portion of a bolt. Such excessive friction involves a large tightening torque, so that a seizure is prone to occur when the nut is tightened with a power wrench or the like.

The invention is therefore intended to provide a structure of an internal thread portion of a nut or the like for preventing looseness which structure has the required torque reduced adequately to resist seizure and which still has a satisfactory effect of preventing looseness, and to provide a method of producing the same.

SUMMARY OF THE INVENTION

In accordance with the invention, there is provided a structure of an internal thread portion for preventing looseness, wherein an exit end portion out of an entrance end portion and the exit end portion of the internal thread portion to be threadedly engaged with an external-thread member is taperingly contracted on the entire circumference thereof so as to have smaller minor diameters of internal thread than a middle portion to form a contracted internal thread portion having a conical section, wherein ridges of the contracted internal thread portion are provided in the form of circumferentially continuing corrugation which has projections projecting toward the center of the contracted internal thread portion and which has depressions depressed away from the center of the contracted internal thread portion, and wherein, with the external-thread member threadedly engaged with the internal thread portion, a plurality of projections in the corrugation of the ridges of the contracted internal thread portion press roots or flanks of the external-thread member and are thereby elastically compressed by the reaction, so as to clamp the external-thread member from outside.

In accordance with the invention, the exit end portion is taperingly contracted on the entire circumference thereof so as to have smaller minor diameters of internal thread than the middle portion to form the contracted internal thread portion having a conical section. Accordingly, there hardly occurs such a variation in the deformation of the internal thread portion as in the case that pressing force(s) for deformation are applied to part of the circumference of the portion. In addition, the ridges in the contracted internal thread portion are provided with circumferentially continuing corrugation, and the projections in the corrugation are in even contact with the entire circumference of the thread portion of an external-thread member. Consequently, local friction is reduced and a seizure is less prone to occur, in comparison with conventional press-contact performed by the entire circumference of the ridges. Furthermore, the projections in the continuing corrugation exert substantially even clamping forces over the entire circumference, thus providing a satisfactory effect of preventing looseness.

When the projections of the ridges in the contracted internal thread portion and the root or flanks of the external-thread member exert pressing forces on each other, the projections of the ridges are elastically compressed. At this time, however, depressions on the both sides of the projections allow compressed bodies of the projections to readily escape toward both sides thereof (i.e., the compressive force readily diffuses into the depressions on both sides). This escape prevents a steep increase in torque in threaded engagement, while, after the completion of engagement, the press-contact between the plurality of projections and the root or flanks provides a good effect of preventing looseness. That is, the compatibility is achieved between a reduction in torque in threaded engagement and the fulfillment of the effect of preventing looseness.

The specific configuration of the corrugation in the contracted internal thread portion may be like, for example, corrugation with a series of arcs, triangles or trapezoids of which projections broaden toward their base ends from their tip ends in plan view, or inverted triangles or inverted trapezoids of which depressions broaden toward their tip ends from their base ends in plan view. In any of the configurations, the tip end of the projection has a smaller area of cross section than the base end and therefore more readily undergoes elastic deformation, which reduces the tightening torque. The configuration corrugated with arcs would reduce the contact area between the projections and the thread portion of the external-thread member, so as to enhance the effect of preventing seizure, and would improve the life of the die. The trapezoidal configuration would enhance the effect of preventing looseness.

It is preferable that the corrugation of the ridges in the contracted internal thread portion is formed continuously over a plurality of threads and that, with respect to adjoining ridges, the depressions and projections of the corrugation are formed respectively at locations corresponding to one another on straight lines which traverse the ridges and which are generally tapered. In this manner, the machining of the corrugation can be readily performed.

More specifically, the number of the threads provided with the corrugation is preferably not less than two and not more than four, and the number of the projections is preferably set within the range from 6 to 20. This range is adequate to keep the balance between the effect of preventing a seizure and reducing the tightening torque and the effect of preventing looseness and to expand the life of the die to prevent the cost from increasing. Too small number of the columns of the projections would expand the life of the die but enhance local friction, thus increasing the probability of the occurrence of the seizure. On the other hand, too large number of the columns of the projections would not cause such a problem of friction but shorten the life of the die, thus causing a rise in cost. It is therefore preferable that the number is determined within the above range.

A method of producing a structure of an internal thread portion for preventing looseness in accordance with the invention comprises the steps of:

forming, in an end portion of a material for the internal thread portion which end is to be an exit end portion in threaded engagement with a mating external-thread member, an exit-side hole having corrugation continuing circumferentially on the inner circumference thereof;

forming a main hole which connects coaxially with the exit-side hole, before, after, or simultaneously with the above step;

cutting an internal thread continuously on both the exit-side hole and the main hole so that the corrugation in the exit end portion remains and extends continuously and circumferentially on ridges of the internal thread; and taperingly contracting the exit end portion over the entire circumference thereof so that the exit end portion has smaller minor diameters of internal thread than a middle portion, and thus forming a contracted internal thread portion having a conical section.

Alternatively, a hole may be formed so as to extend axially through an internal-thread member and, after that, the step of forming corrugation in the exit end portion and then the step of contracting may be performed. In accordance with such a method, in either case, continuous corrugation can be formed over one or more threads on ridges of the exit end portion of the internal thread portion, and a desired form of contraction can be readily achieved.

More specifically, the contracting step of forming the contracted thread portion may be performed as follows: The outer circumferential surface of the exit end portion of a material for the internal thread portion can be tapered so as to have outside diameters which are the smaller, the closer to the end side. A die having a tapered inner circumferential surface which is to engage with the tapered outer circumferential surface of the material for the internal thread portion can be pressed relatively against the tapered outer circumferential surface in the axial direction. With such tapered outer circumferential surface of the exit end portion of the internal-thread member, the exit end portion has the smaller thicknesses, the closer to the extremity thereof. Moreover, the internal thread portion of the exit end portion has continuous depressions over the entire circumference thereof. Accordingly, a process of squeezing inward can be readily performed to evenly contract the exit end portion.

DETAILED DESCRIPTION OF THE PREFERRED EMBODIMENT

Figure 1:
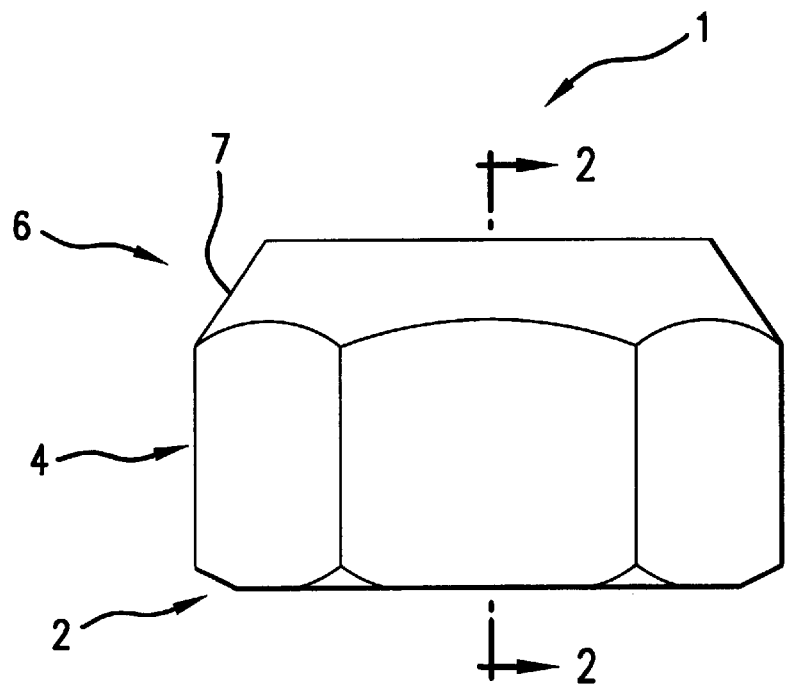
FIG. 1 is an elevational view of a self-locking nut in accordance with an embodiment of the invention.
Figure 2:
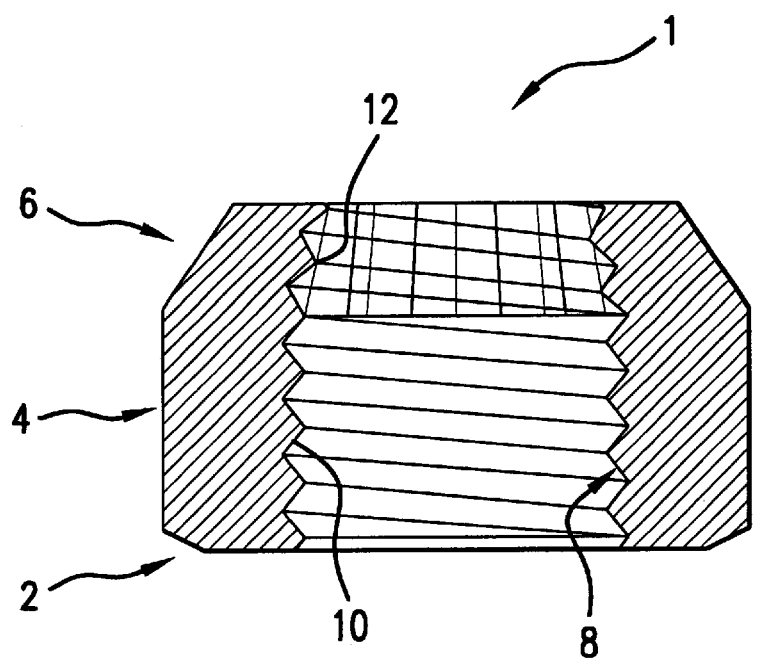
FIG. 2 is a sectional view of the same.

Hereinbelow, preferred embodiments of the invention will be described with reference to the embodiments illustrated in the appended drawings.

FIGS. 1 to 4 illustrate a self-locking nut 1 according to one embodiment of the invention. In a plan view of the self-locking nut 1 (hereinafter, also referred to as "the nut"), a portion extending from an entrance end portion 2, from which a bolt will enter to engage threadedly with the nut, to a middle portion 4 has a hexagonal shape. On the other hand, an exit end portion 6 has an appearance in the shape of a frustum of a cone, and forms a tapered outer circumferential surface 7.

In the center of the nut 1, an internal thread portion 8 is formed so as to extend therethrough from the entrance end portion 2 to the exit end portion 6. The internal thread portion 8 comprises a main internal thread portion 10 extending from the entrance end portion 2 to the middle portion 4 and having a uniform minor diameter, and a contracted internal thread portion 12 extending continuously from and concentrically with the main internal thread portion 10 and contracted in the exit end portion 6.

The contracted internal thread portion 12 is taperingly contracted over the entire circumference thereof so that the minor diameters of the portion 12 are smaller than the minor diameter of the main internal thread portion 10. The contracted internal thread portion 12 thus has a conical section. Imaginary lines assumed (not shown in the drawing) linking the crests (or the root) of the main internal thread portion 10 form straight lines parallel to the thread axis. By contrast, imaginary lines linking the crests or the root of the contracted internal thread portion 12 form straight or curved lines which are inclined slightly so as to be the closer to the thread axis, the closer to the exit end portion 6. That is, the closer to the exit end portion 6, the higher the degree of the contraction is. In the relevant drawings herein, the degree of the contraction may be exaggerated for the sake of clarity, and the geometries of the embodiments may not be represented exactly.

Figure 3:
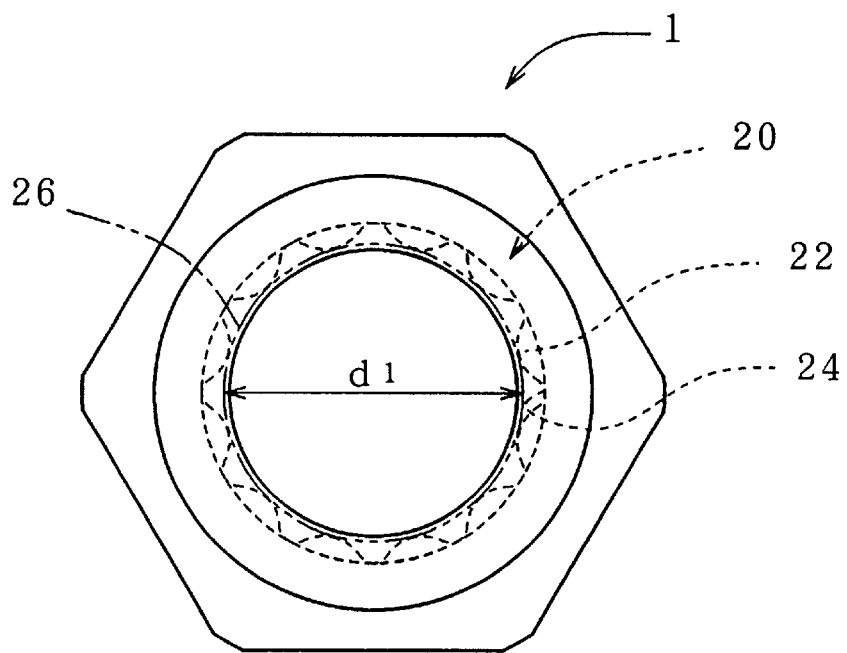
FIG. 3 is a plan view of the same.
Figure 4:
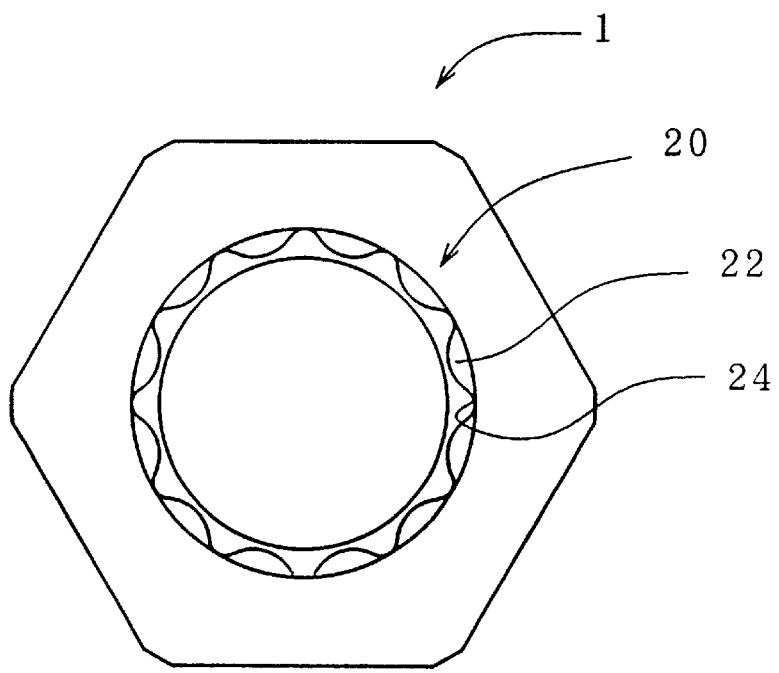
FIG. 4 is a bottom view of the same.

The contracted internal thread portion 12 comprises a little less than three threads. As shown in FIGS. 3 and 4, on ridges in the portion 12 is formed corrugation 20, which comprises projections and depressions alternating continuously along the circumference of the portion. The corrugation 20 is continuously formed throughout the ridges and, with respect to adjoining ridges, projections 22 and depressions 24 of the corrugation 20 are formed at locations corresponding to one another on straight lines traversing the ridges, i.e., in vertical planes including the thread axis. In one thread of the contracted internal thread portion 12 are provided, for example, twelve pairs of the projections 22 and the depressions 24 of the corrugation 20.

The corrugation 20 starts from the end surface of the exit end portion 6 and terminates in a surface which lies adjacent to the border between the contracted internal thread portion 12 and the main internal thread portion 10 and which is parallel to the end surface (i.e., perpendicular to the thread axis). The ridges forming a spiral, however, do not allow the corrugation 20 adjacent the starting point and the terminal point to cut off a ridge across the entire thickness thereof. In this respect, the complete corrugation 20 is formed on a little less than two threads, although the contracted internal thread portion 12 has a little less than three threads.

In the corrugation 20, the projections 22 project toward the center of the contracted internal thread portion 12, and the depressions 24 are depressed away from the center of the portion 12. The extremities of the projections 22 generally correspond to the extremities of the ridges of the above-mentioned contracted internal thread portion 12, while the roots of the depressions 24 generally correspond to the roots of the contracted internal thread portion 12. The contraction of the contracted internal thread portion 12 involves the contraction of the corrugation 20. As a result, the diameter d1 of an inscribed circle 26 which links the extremities of a plurality of projections 22 ranging continuously and circumferentially is made smaller than the root diameter of a bolt which is to be engaged threadedly. On the other hand, the diameter of an inscribed circle touching the root of a plurality of depressions 24 is larger than or generally equal to the root diameter of the bolt.

Figure 5:
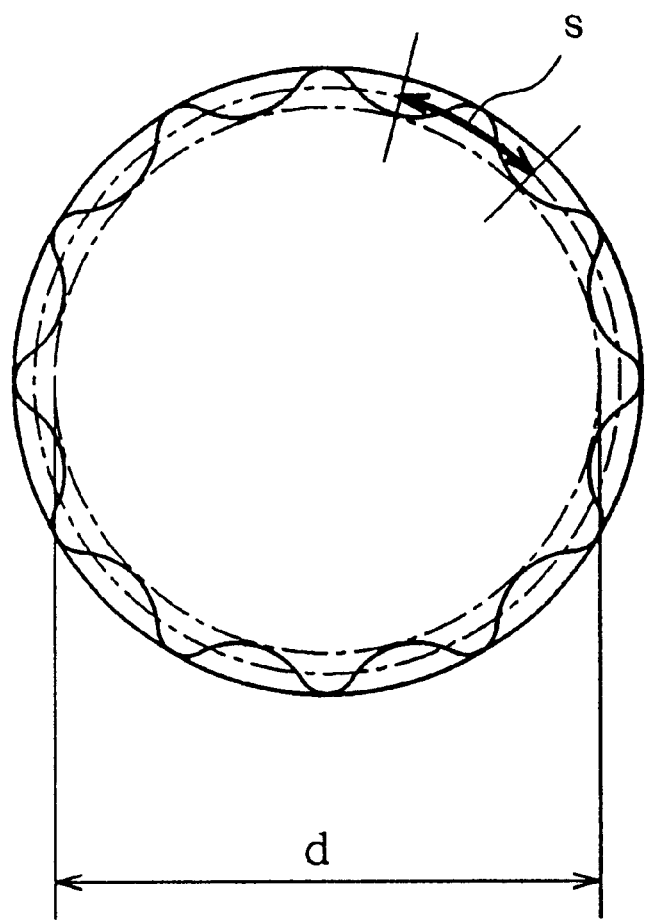
FIG. 5 illustrates a minor diameter of a contracted internal thread portion and a pitch of corrugation of the portion.

Adequate number and pitch of the projections and depressions in the corrugation 20 (in other words, those of the projections 22) provided in the contracted internal thread portion 12 in consideration of the balance between the effect of preventing looseness and the tightening torque as well as the life of the die cannot be determined unconditionally, because those values may be varied depending on the average minor diameter d of the contracted internal thread portion 12 and the thread pitch of the contracted internal thread portion. The sizes and number of the projections and depressions of the corrugation 20, however, are preferably determined so that, for example, the pitch s of the projections and depressions of the corrugation 20 is in the range of 0.1 d to 0.5 d with respect to the average minor diameter d of the contracted internal thread portion shown in FIG. 5.

Figure 6:
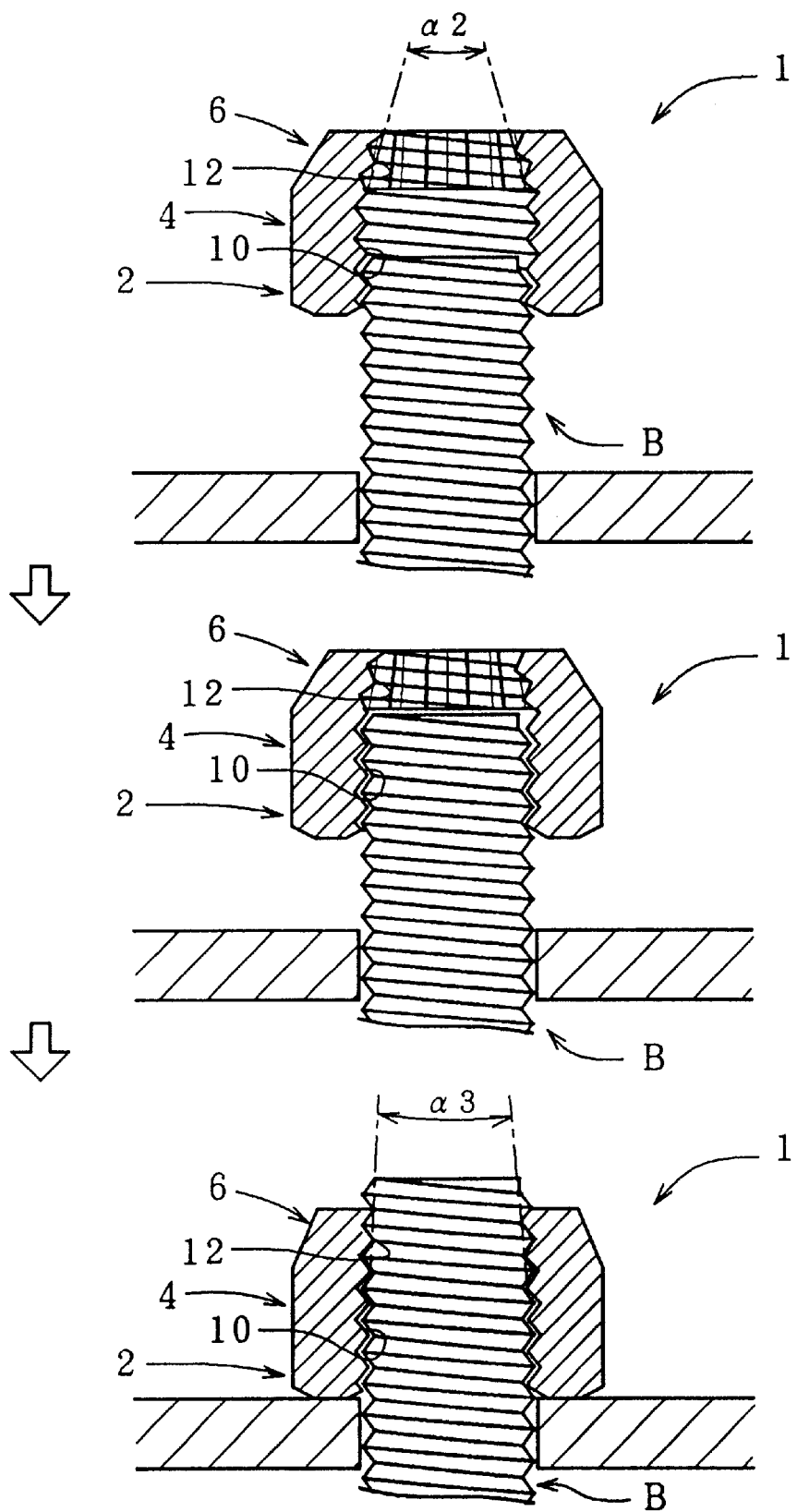
FIG. 6 illustrates an effect of preventing looseness, which effect is achieved by the elastic deformation of an exit end portion engaged threadedly with a bolt.

FIG. 6 illustrates the function of the self-locking nut 1, having such a structure, and a bolt B which are being engaged threadedly with each other. As the self-locking nut 1 is threadedly engaged with the bolt B (or the bolt B is threadedly engaged with the self-locking nut 1) with the main internal thread portion 10 in the entrance end portion 2 engaged initially, the tip of the bolt B reaches the contracted internal thread portion 12 in the latter part of or nearly at the end of the threaded engagement of the bolt B and the nut 1, as shown in the drawing in the middle of FIG. 6.

Figure 7:
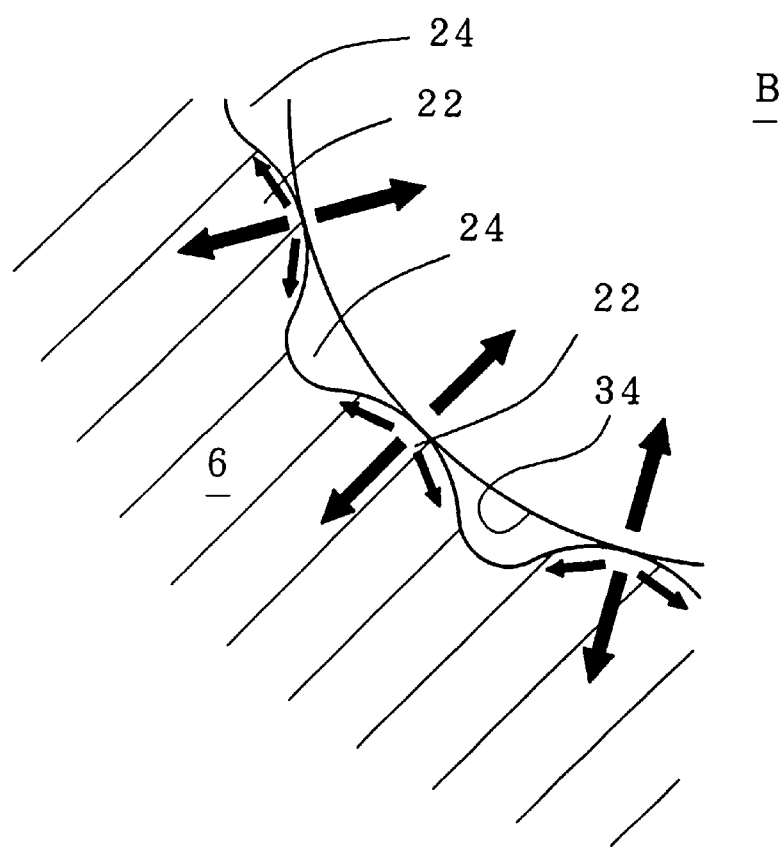
FIG. 7 illustrates the effect of corrugation of the contracted internal thread portion.

With subsequent progress of the threaded engagement of the nut 1 and the bolt B, as shown in FIG. 7, a plurality of projections 22 in the contracted internal thread portion 12 of the nut 1 are brought into contact with root 34 (or flanks) of the bolt B at a large number of locations on the circumference thereof, because the diameters d1 (in FIG. 3) of the inscribed circles 26 on a large number of projections 22 in the contracted internal thread portion 12 is smaller than the root diameter of the bolt B. In this manner, the projections 22 and the root 34 (or the flanks) exert pressing forces on each other, and the projections 22 are elastically compressed. Conceptually, however, compressed bodies of the projection 22 readily escape toward their both sides, because the depressions 24 exit on the both sides of the projections 22. That is, the compressive force acting on the projection 22 in an outward direction along the diameter readily diffuses into the depressions 24 on both sides. Accordingly, an excessive increase in torque in the threaded engagement can be prevented, in contract to the configuration having no corrugation 20. Additionally, after the completion of the threaded engagement, the press-contact between the plurality of projections 22 and the root 34 (or the flanks) provides a sufficient effect of preventing looseness. Such a state is illustrated in the lowest drawing in FIG. 6.

As the contracted internal thread portion 12 of the nut 1 and the bolt B threadedly engage with each other while exerting pressing forces between the projections 22 and the root 34 (or the flanks), the minor diameters of the contracted internal thread portion 12 are typically increased to a certain extent in an elastic manner. In such a case, the cone angle of the minor diameters of the contracted internal thread portion 12 may be decreased from $\alpha 2$ to $\alpha 3$ in FIG. 6, by a given amount. In this state, tension acts on the contracted internal thread portion 12 in the circumferential direction thereof ,and further acts as pressing force on the root 34 (or the flanks) of the bolt, via a large number of projections 22. As a result, a sufficient effect of preventing looseness can be obtained without causing an excessive increase in torque and a seizure.

Figure 8:
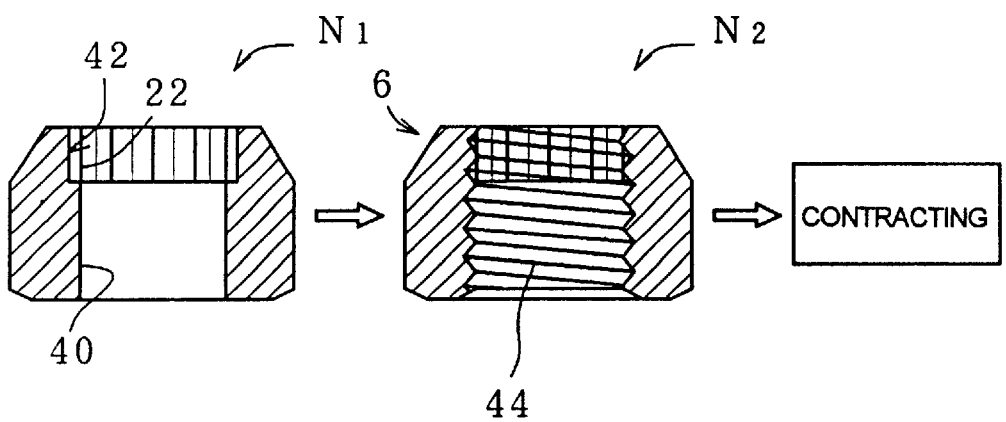
FIG. 8 is a process drawing illustrating a first method of producing the self-locking nut.

Hereinbelow, a method of producing such a self-locking nut 1 will be described. For example, as shown in FIG. 8, a material for the nut is set in a forging die and publicly known forging operation is performed to form the outside surface of the nut and to simultaneously form, inside the nut, a main hole 40 for the formation of the main internal thread portion 10 and an exit-side hole 42 provided with the corrugation 20 (in FIG. 4). At this time, the extremities of the projections 22 in the corrugation 20 are generally aligned with the crests of the internal thread which is to be formed, i.e., with the inner surface of the main hole 40. The bottom of the depressions are formed so as to generally coincide with the root of the internal thread which is to be formed.

An internal thread 44 is then cut continuously on both the main hole 40 and the exit-side hole 42 of this intermediate product N1 by a publicly known method using a tap or the like. Thus the corrugation 20 (in FIG. 4) which coincides with ridges on the thread are formed on the entire circumference of the threaded portion in the exit end portion 6.

Figure 11:
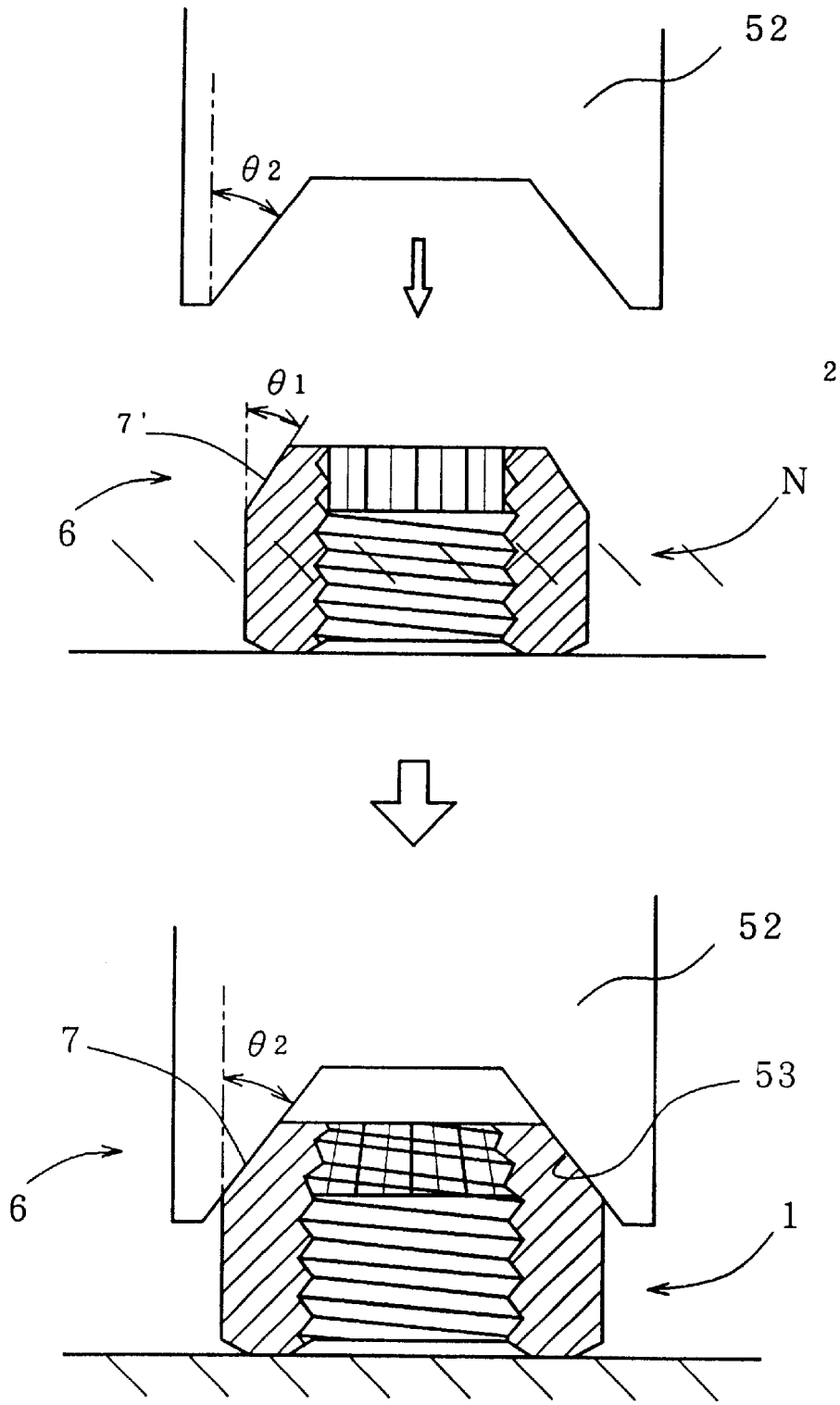
FIG. 11 illustrates a process of contracting the nut.

The threaded intermediate product N2 is then pressed with a press die 52, for example, as shown in FIG. 11, so that the exit end portion 6 is contracted. The cone angle $\theta 1$ of a tapered outer circumferential surface 7' on the exit end portion 6 of the nut 1 which has not yet been contracted is formed so as to be smaller than the cone angle $\theta 2$ of the self-locking nut 1, shown in the lower drawing of FIG. 11, which has been contracted. When the tapered outer circumferential surface 7' of the intermediate product N2 is crimped by a press surface 53 formed in conformity with the cone angle θ2, the tapered outer circumferential surface 7 of the nut 1 as an end product undergoes plastic deformation so as to have the cone angle θ2. As a result, the exit end portion 6 is contracted inwardly.

Figure 12:
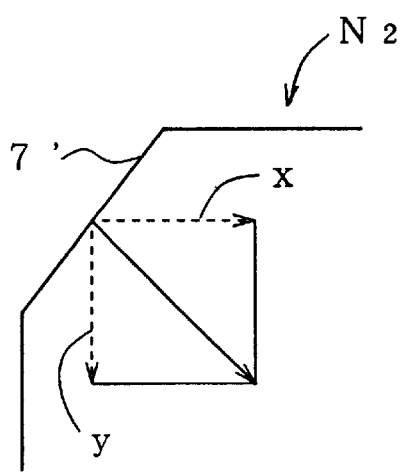
FIG. 12 illustrates the relation of forces acting in the contracting process, which is performed by the pressing on a tapered outer circumferential surface of the nut (an intermediate product)
Figure 13:
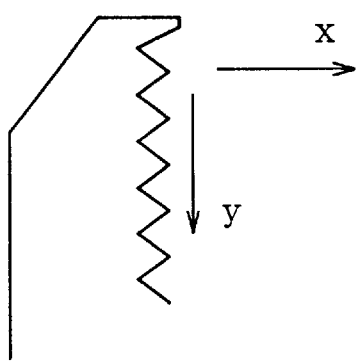
FIG. 13 illustrates the pressing force resolved into a component in the direction of the diameter of the nut and into a component in the direction of the axis of the same.
Figure 14:
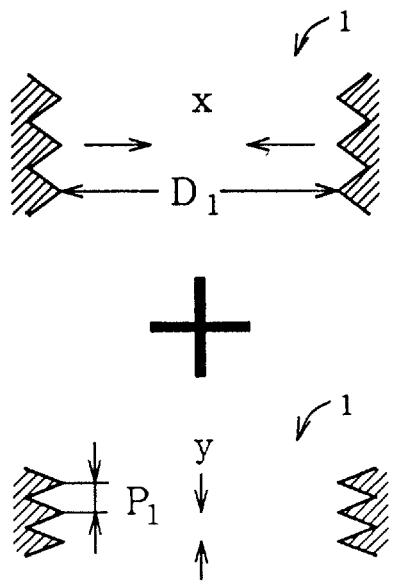
FIG. 14 illustrates contracted deformation in the direction of the diameter and compression deformation in the direction of the axis.

As shown in FIGS. 12 and 13, the pressing force acting on the tapered outer circumferential surface 7' resolves into a compressive force in the direction x of the diameter of the intermediate nut N2 and into a compressive force in the direction y of the axis. As shown in FIG. 14, the compressive force in the direction x of the diameter contracts the diameter D1 of the exit end portion of the nut 1 as a finished product, thus providing the corrugation 20 with the function of preventing rotation, as mentioned above.

On the other hand, the compressive force in the direction y of the axis acts so as to collapse the exit end portion of the nut 1 to a certain extent, so that a thread pitch P1 in the exit end portion is necessarily reduced. In this manner, screwing a bolt into the nut forces thread ridges of the bolt to be threaded between the narrowed thread ridges of the nut 1 in the relevant part. As a result, frictional forces larger than usual act between the thread ridges of the bolt and of the nut 1, and thus the frictional forces also contribute to the function of preventing rotation.

Figure 9:
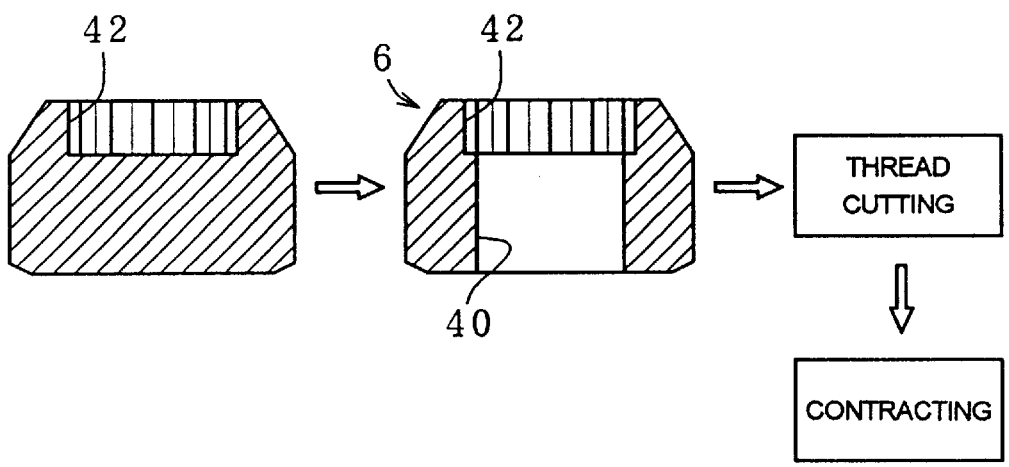
FIG. 9 is a process drawing illustrating a second method of producing the self-locking nut.
Figure 10:
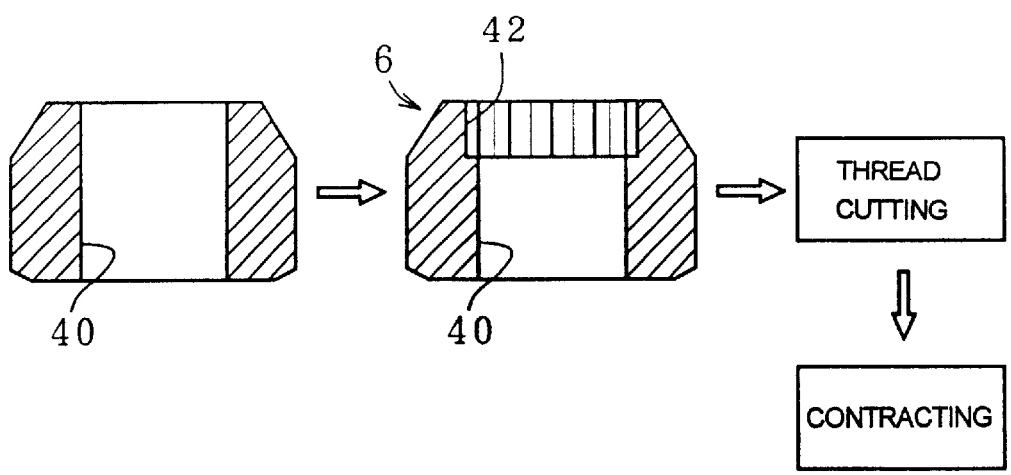
FIG. 10 is a process drawing illustrating a third method of producing the self-locking nut.

In another method of producing the self-locking nut 1, as shown in FIG. 9, the exit-side hole 42 provided with the corrugation 20 (FIG. 4) may be formed by forging in advance, and then the main hole 40 may be stamped out by a press, and the processes of thread cutting and contracting may follow. Alternatively, as shown in FIG. 10, those production processes may be performed in the following sequence: After the main hole 40 is formed by forging so as to extend therethrough axially, the exit-side hole 42 having the corrugation 20 is formed by a press. Subsequently, the process of thread cutting on both the holes 40 and 42 and then the process of contracting are performed.

Figure 15:
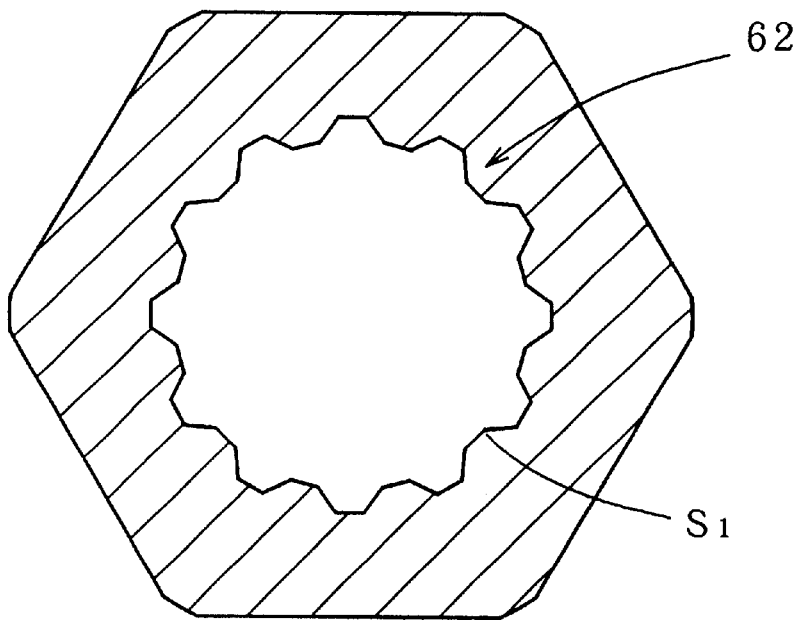
FIG. 15 illustrates another example of corrugation form.
Figure 16:
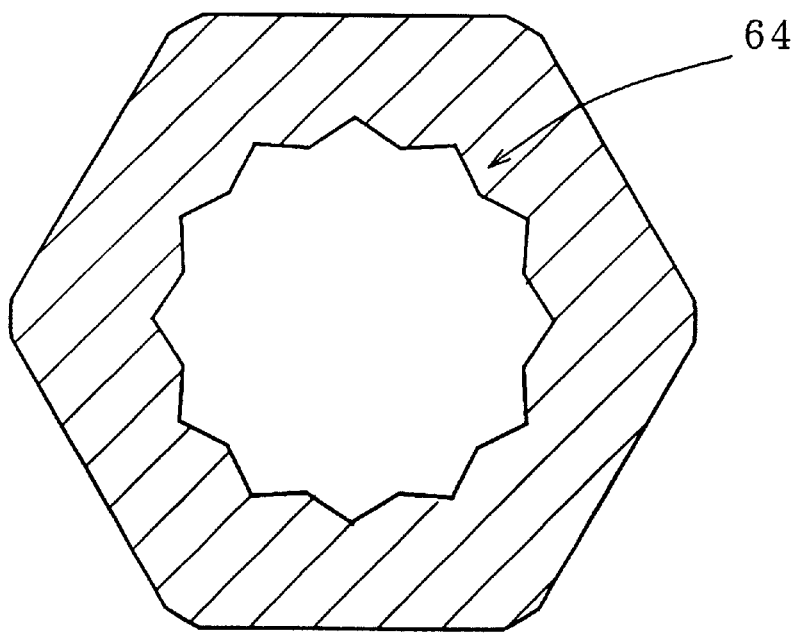
FIG. 16 illustrates still another example of corrugation form.

The contracted internal thread portion may be provided with trapezoidal corrugation 62, as shown in FIG. 15 (wherein, strictly, the top surface of the trapezoidal projection is in the shape of an arc-like depression and wherein the one-round total of an area S1 of a discrete thread ridge is, for example, between one-third and one-quarter or less of the one-round area of continuous thread ridge), or may be provided with triangular corrugation 64, as shown in FIG. 16.

Figure 17:
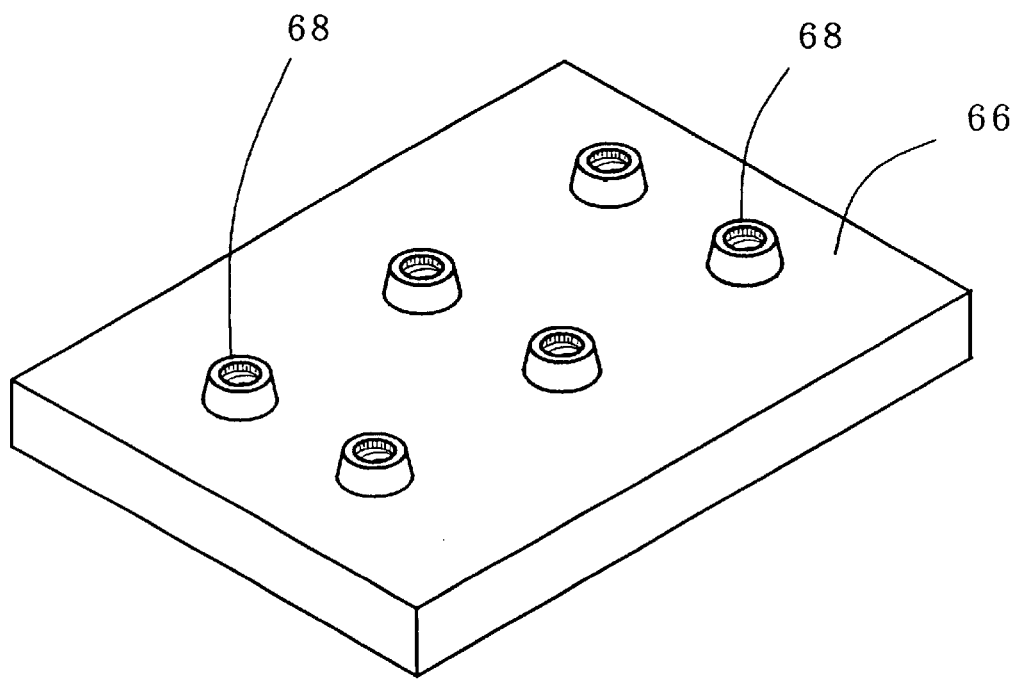
FIG. 17 illustrates another embodiment of the invention.
Figure 18:
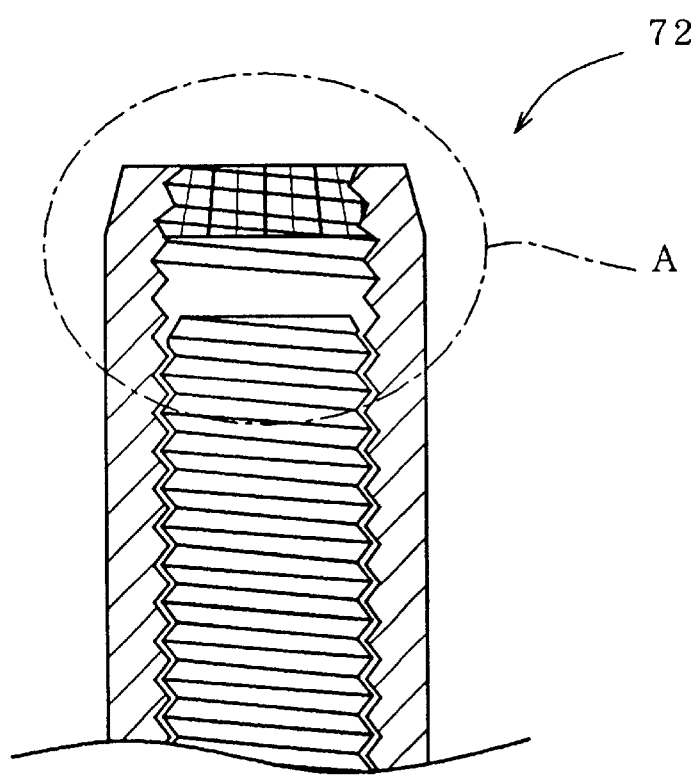
FIG. 18 illustrates still another embodiment of the invention.

The invention is not limited to a nut, but may be generally applied to a member having an internal-thread structure. For example, as shown in FIG. 17, in a plurality of projection-like internal thread portions 68 provided on a frame member 66 and having the function of preventing looseness, the same effect as the self-locking nut 1 can be obtained by contracting the exit end portions thereof and by providing corrugation on ridges of the internal threads inside the portions. The invention may be similarly applied to a pipe-like internal-thread member 72, as shown in FIG. 18. A portion A in the drawing corresponds to the structure of the self-locking nut 1 above-mentioned.

What is claimed is:

1. A structure of a nut internal thread portion for preventing looseness, wherein an exit end portion of an internal thread portion of the nut is taperingly contracted on the entire circumference thereof; wherein the nut has smaller minor diameters of internal thread than a middle portion, wherein ridges of the contracted internal thread portion are provided in the form of a circumferentially continuing corrugation which has a plurality of projections projecting toward the center of the contracted internal thread portion and which has depressions depressed away from the center of the contracted internal thread portion, wherein circles inscribed by the plurality of projections are gradually smaller towards an exit side hole;

wherein, when the nut is adapted to engage an external-thread member with the internal thread portion, the plurality of projections in the corrugation of the ridges of the contracted internal thread portion press roots or flanks of the external-thread member and are thereby elastically compressed, so as to clamp the external-thread member wherein the number of the threads provided with the corrugation is not less than two and not more than four, and wherein the number of the projections in the corrugation is within the range from 10 to 14.

2. The nut structure of the internal thread portion for preventing looseness, as claimed in claim 1, wherein the corrugation of the ridges of the contracted internal thread portion is formed of a series of arcs.

3. The structure of a nut internal thread portion for preventing looseness, as claimed in claim 1, wherein the corrugation of the ridges of the contracted internal thread portion is formed of a series of triangles having a projection which broadens toward the base end thereof from the tip end in plan view.

4. The structure of a nut internal thread portion for preventing looseness, as claimed in claim 1, wherein the corrugation of the ridges of the contracted internal thread portion is formed continuously over a plurality of threads and wherein, with respect to adjoining ridges, the depressions and projections of the corrugation are formed respectively at locations corresponding to one another on straight lines which traverse the ridges.

5. A method of producing the structure of the nut as claimed in claim 1 the nut having the internal thread portion for preventing looseness, the method comprising the steps of:

forming at the exit end portion an exit-side hole having the circumferentially continuing corrugation on an inner circumference thereof;

forming a main hole which connects coaxially with the exit-side hole, before, after, or simultaneously with the above step;

cutting an internal thread continuously on both the exit-side hole and the main hole so that the circumferentially continuing corrugation in the exit end portion remains and extends continuously and circumferentially on ridges on the internal thread formed the exit end portion; and taperingly contracting the exit end portion over the entire circumference thereof so that the exit end portion has smaller minor diameters of internal thread than a middle portion, and thus forming the contracted internal thread portion having a conical section.

6. The method of producing a structure of the nut, as claimed in claim 5, wherein the contracted internal thread portion is formed in the exit end portion having a diameter of an inscribed circle which links extremities of projections in the circumferentially continuing corrugation of the ridges of the internal thread portion is smaller than minor diameters of external-thread member which is to be engaged threadedly with the internal thread portion.

7. The method of producing a structure of the nut, as claimed in claim 5, wherein an outer circumferential structure of the exit end portion of the internal thread portion is tapered so as to have outside diameters which are smaller closer to an exit end side, and wherein a die having a tapered inner circumferential surface engages with the tapered outer circumferential surface and is pressed against the tapered outer circumferential surface in the axial direction to form the contracted internal thread portion.

8. A nut and an external-thread member comprising in combination a nut internal thread portion for preventing looseness, wherein the mirror thread diameter at an exit end portion of an internal thread portion of the nut is taperingly contracted on the entire circumference thereof;

wherein ridges of the contracted internal thread portion are provided in the form of a circumferentially continuing corrugation which has a plurality of projections projecting toward the center of the contracted internal thread portion and which has depressions depressed away from the center of the contracted internal thread portion, and wherein, the external-thread member is threadedly engaged with the internal thread portion, the plurality of projections in the corrugation of the ridges of the contracted internal thread portion press roots or flanks of the external-thread member and are thereby elastically compressed, so as to clamp the external-thread member.

9. The nut and external thread member as claimed in claim 8, wherein the corrugation of the ridges of the contracted internal thread portion is formed of a series of arcs.

10. The nut and external thread member as claimed in claim 8, wherein the corrugation of the ridges of the contracted internal thread portion is formed on a series of triangles having a projection which broadens toward the base end thereof from the tip end in plan view.

11. The nut and external thread member as claimed in claim 8, wherein the corrugation of the ridges of the contracted internal thread portion is formed continuously over a plurality of threads and wherein, with respect to adjoining ridges, the depressions and projections of the corrugation are formed respectively at locations corresponding to one another on straight lines which traverse the ridges.

12. The nut and external thread member as claimed in claim 8, wherein the number of the threads provided with the corrugation is not less than two and not more than four.

13. The nut and external thread member as claimed in claim 8, wherein the number of the projections in the corrugation is within the range from 10 to 14.

14. A method of producing the structure of a nut as claimed in claim 8, the nut having the internal thread portion for preventing looseness, the method comprising the steps of:

forming at the end portion an exit-side hole having the circumferentially continuing corrugation on an inner circumference thereof;

forming a main hole which connects coaxially with the exit-side hole, before, after, or simultaneously with the above step;

cutting an internal thread continuously on both the exit-side hole and a main hole wherein the circumferentially continuing corrugation in the exit end portion remains and extends continuously and circumferentially on the ridges of the internal thread formed in the exit end portion; and taperingly contracting the exit end portion over the entire circumference thereof so that the exit end portion has smaller minor diameters of internal thread than a middle portion, and thus forming the contracted internal thread portion having a conical section.

15. The method of producing a structure of nut, as claimed in claim 14, wherein the contracted internal thread portion is formed in the exit end portion so that the diameter of an inscribed circle which links the extremities of projections in the circumferentially continuing corrugations of the ridges of the internal thread portion is smaller than minor diameters of an external-thread member which is to be engaged threadedly with the internal thread portion.

16. The method of producing a structure of the nut, as claimed in claim 14, wherein an outer circumferential surface of the exit end portion for the internal thread portion is tapered so as to have outside diameters which are smaller closer to an exit end side, and wherein a die having a tapered inner circumferential surface which engages with the tapered outer circumferential surface and is pressed against the tapered outer circumferential surface in the axial direction to form the contracted internal thread portion.

* * * * *